United States Patent
Choi et al.

(10) Patent No.: US 9,744,965 B2
(45) Date of Patent: Aug. 29, 2017

(54) ENGINE OPERATION CONTROL SYSTEM AND METHOD OF ECO-FRIENDLY VEHICLE

(71) Applicants: Hyundai Motor Company, Seoul (KR); Kia Motors Corporation, Seoul (KR)

(72) Inventors: Yong Kak Choi, Seoul (KR); Chun Hyuk Lee, Gyeonggi-Do (KR); Tae Wook Park, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/958,023

(22) Filed: Dec. 3, 2015

(65) Prior Publication Data

US 2017/0057485 A1 Mar. 2, 2017

(30) Foreign Application Priority Data

Sep. 2, 2015 (KR) ........................ 10-2015-0124489

(51) Int. Cl.
  *B60W 20/13* (2016.01)
  *B60W 20/40* (2016.01)
  *B60W 10/06* (2006.01)
  *B60W 10/08* (2006.01)
  *B60W 10/26* (2006.01)
  (Continued)

(52) U.S. Cl.
  CPC ............ *B60W 20/13* (2016.01); *B60W 10/06* (2013.01); *B60W 10/08* (2013.01); *B60W 10/26* (2013.01); *B60W 20/16* (2016.01);
  *B60W 20/40* (2013.01); *B60W 30/1882* (2013.01); *B60W 2510/244* (2013.01); *B60W 2540/10* (2013.01); *Y10S 903/93* (2013.01)

(58) Field of Classification Search
  CPC ...... B60W 20/13; B60W 20/40; B60W 10/06; B60W 10/08; B60W 2510/244; B60W 2540/10; Y10S 903/93
  See application file for complete search history.

(56) References Cited

U.S. PATENT DOCUMENTS

2009/0157244 A1 6/2009 Kim
2014/0039736 A1 2/2014 Heap et al.
(Continued)

FOREIGN PATENT DOCUMENTS

JP 2007-045210 A 2/2007
JP 2009-190512 A 8/2009
(Continued)

*Primary Examiner* — Aaron L Troost
(74) *Attorney, Agent, or Firm* — Mintz Levin Cohn Ferris Glovsky and Popeo, P.C.; Peter F. Corless

(57) ABSTRACT

An engine operation control system and method of an eco-friendly vehicle are provided to achieve optimal engine operating efficiency by changing a region for using an engine operating point based on a battery state of charge (SOC) region and a driver requirement torque. The system and method satisfy a driver requirement torque and achieve defense of battery state of charge (SOC) and optimal engine operating efficiency by changing an engine operating point based on a battery state of charge (SOC) and a driver requirement torque to an engine operating point where a battery discharge amount is minimized and a battery charging amount is maximized.

22 Claims, 7 Drawing Sheets

(51) Int. Cl.
*B60W 30/188* (2012.01)
*B60W 20/16* (2016.01)

(56) References Cited

U.S. PATENT DOCUMENTS

| | | |
|---|---|---|
| 2014/0067180 A1 | 3/2014 | Tagawa et al. |
| 2016/0107518 A1* | 4/2016 | Okuwaki ............... B60K 6/387 |
| | | 701/22 |
| 2016/0244043 A1* | 8/2016 | Nefcy .................. B60W 10/26 |

FOREIGN PATENT DOCUMENTS

| | | |
|---|---|---|
| JP | 2012-224220 A | 11/2012 |
| JP | 2013-075547 A | 4/2013 |
| JP | 2014-161178 A | 9/2014 |
| JP | 2015-058786 A | 3/2015 |
| KR | 10-2009-0062565 A | 6/2009 |
| KR | 10-2011-0139611 | 12/2011 |
| KR | 10-2012-0029917 | 3/2012 |
| KR | 10-1542988 B1 | 8/2015 |

\* cited by examiner

ENGINE OPERATION CONTROL SYSTEM AND METHOD OF ECO-FRIENDLY VEHICLE

CROSS-REFERENCE TO RELATED APPLICATION

This application claims under 35 U.S.C. §119(a) the benefit of priority to Korean Patent Application No. 10-2015-0124489 filed on Sep. 2, 2015, the entire contents of which are incorporated herein by reference.

BACKGROUND (a) Technical Field

The present invention relates to an engine operation control system and method of an eco-friendly vehicle, and more particularly, to an engine operation control system and method of an eco-friendly vehicle, which achieve optimal engine operation efficiency by changing a region using an engine operating point based on a battery state of charge (SOC) region and a driver requirement torque.

(b) Background Art

Hybrid vehicles and plug-in hybrid vehicles are types of eco-friendly vehicles which employ a motor as well as an engine as a power source to reduce exhaust gas and to enhance fuel efficiency and include a power transmission system installed therein, which separately transfers engine or motor power to driving wheels or transfers engine and motor power together to the driving wheels. An engine system of a hybrid vehicle may also include an exhaust gas recirculation (EGR) device installed therein to reduce exhaust gas and to enhance fuel efficiency.

A driving mode of the hybrid vehicle may include an electric vehicle (EV) in which the vehicle is driven by a driving force of a motor, a hybrid electric vehicle (HEV) mode in which the vehicle is driven by both driving forces of an engine and a motor, an engine exclusive mode in which the vehicle is driven by engine driving force.

An engine operating point of the hybrid vehicle may vary based on a driver requirement torque and a current vehicle battery state of charge (SOC), but there is a need to control an optimal engine operating point in which a minimum battery SOC discharge amount is consumed. In addition, when an operation of the EGR is repeatedly started and released based on variations of the engine torque, efficiency for reducing exhaust gas may be degraded and fuel efficiency may also be degraded, and thus there is a need to control an optimal engine operating point when the EGR is operated.

The above information disclosed in this section is merely for enhancement of understanding of the background of the invention and therefore it may contain information that does not form the prior art that is already known in this country to a person of ordinary skill in the art.

SUMMARY

The present invention provides an engine operation control system and method of an eco-friendly vehicle, which may satisfy a driver requirement torque and achieve defense of battery state of charge (SOC) and optimal engine operating efficiency by changing an engine operating point based on a battery state of charge (SOC) and a driver requirement torque to an engine operating point where a battery discharge amount may be minimized and a battery charging amount may be maximized.

In an exemplary embodiment, an engine operation control system of an eco-friendly vehicle may include a battery state of charge (SOC) determination unit configured to determine a battery SOC state, and a hybrid control unit (HCU) configured to change and adjust an engine operating point based on the determined battery SOC state and a driver requirement torque. When the battery SOC state is in a normal state, the hybrid control unit (e.g., controller) may be configured to operate the vehicle to be driven with an engine operating point in an optimal operating line (OOL) of an engine, and when the battery SOC state is equal to or less than the normal state, the hybrid control unit may be configured to change and adjust the engine operating point based on a comparison result between the driver requirement torque and an engine torque of an OOL of the engine.

In another exemplary embodiment, an engine operation control method of an eco-friendly vehicle may include determining a battery state of charge (SOC) state, determining a driver requirement torque, and changing and adjusting an engine operating point based on the determined battery SOC state and driver requirement torque. When the battery SOC state is in a normal state, the vehicle may be driven with an engine operating point in an optimal operating line (OOL) of an engine, and when the battery SOC state is equal to or less than the normal state, the engine operating point may be changed and adjusted based on a comparison result between the driver requirement torque and an engine torque of an OOL of the engine.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
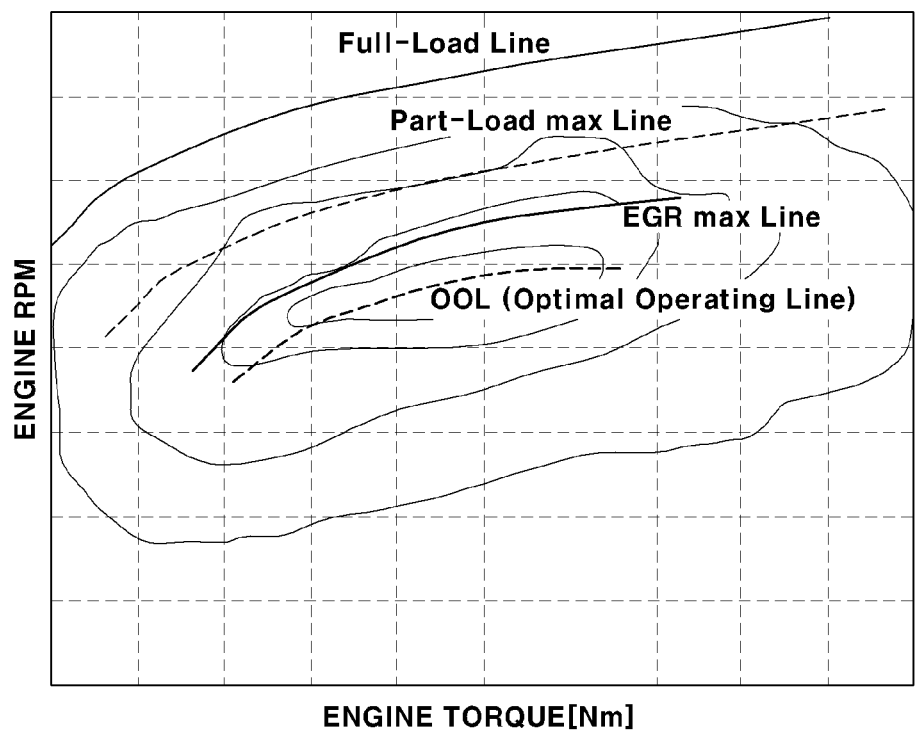
FIG. 1 is a velocity-torque diagram illustrating an engine operating point of a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
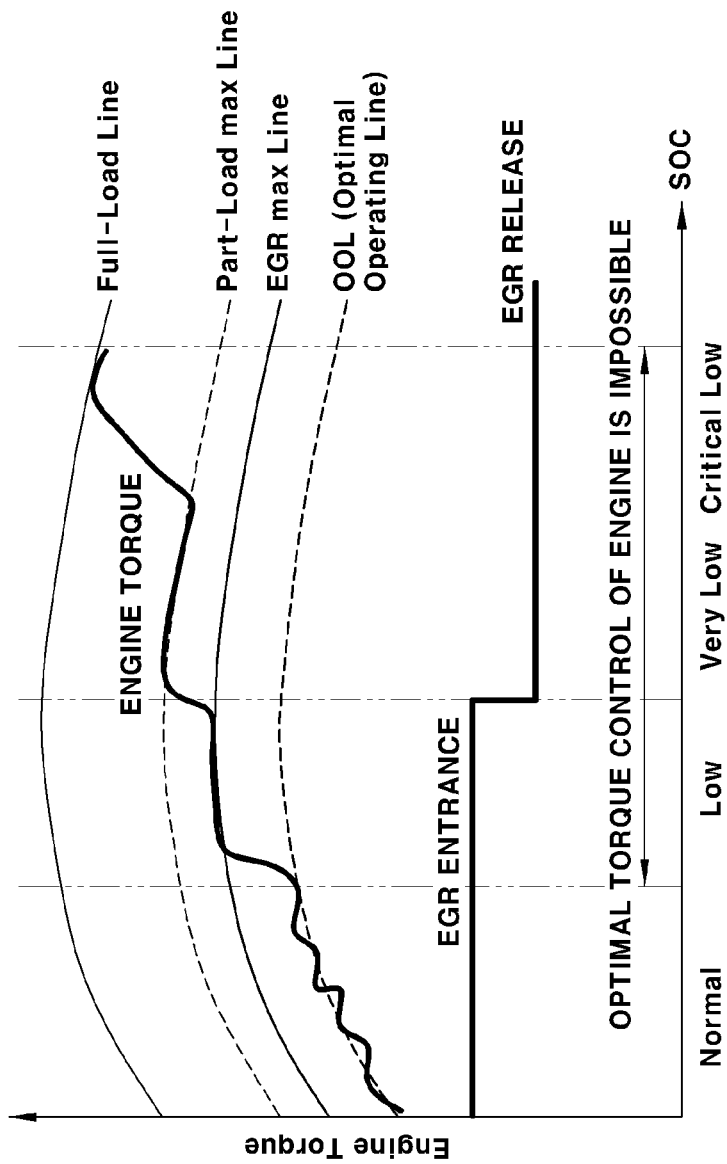
FIG. 2 is a graph illustrating engine torque in an engine operating point that varies according to a battery state of charge (SOC) according to an exemplary embodiment of the present invention.

For understanding of the present invention, an engine operating point of a hybrid vehicle will be described below. FIG. 1 is a velocity-torque diagram illustrating an engine operating point of a hybrid vehicle. FIG. 2 is a graph illustrating engine torque in an engine operating point that varies according to a battery state of charge (SOC).

As illustrated in FIG. 1, an engine operating point of a hybrid vehicle including an exhaust gas recirculation (EGR) installed therein may include an optimal operating line (OOL) constituting an optimal operating point of an engine, an EGR max line indicating a maximum engine torque line when an operation of the EGR is started, a part-load max line indicating a maximum engine torque line when an engine is driven in engine lambda <1, a full-load max line indicating a maximum torque line of an engine, and so on. As illustrated in FIG. 2, when a battery SOC is divided into normal, low, very low, and critically low, an engine operating point and an engine torque at the engine operating point may vary based on each battery SOC and a driver requirement torque, and thus when the battery SOC is low, very low, and critically low except normal, it may be difficult to optimally adjust an engine torque.

According to an exemplary embodiment of the present invention, an engine operating point may vary based on a battery SOC and a driver requirement torque and may be varied to a level in which a battery discharge amount based on motor discharging is minimized and a motor charging operation may also be guided to maximize a battery charging amount. In particular, an engine drive control system and method of an eco-friendly vehicle according to an exemplary embodiment of the present invention will be described below.

Figure 3:
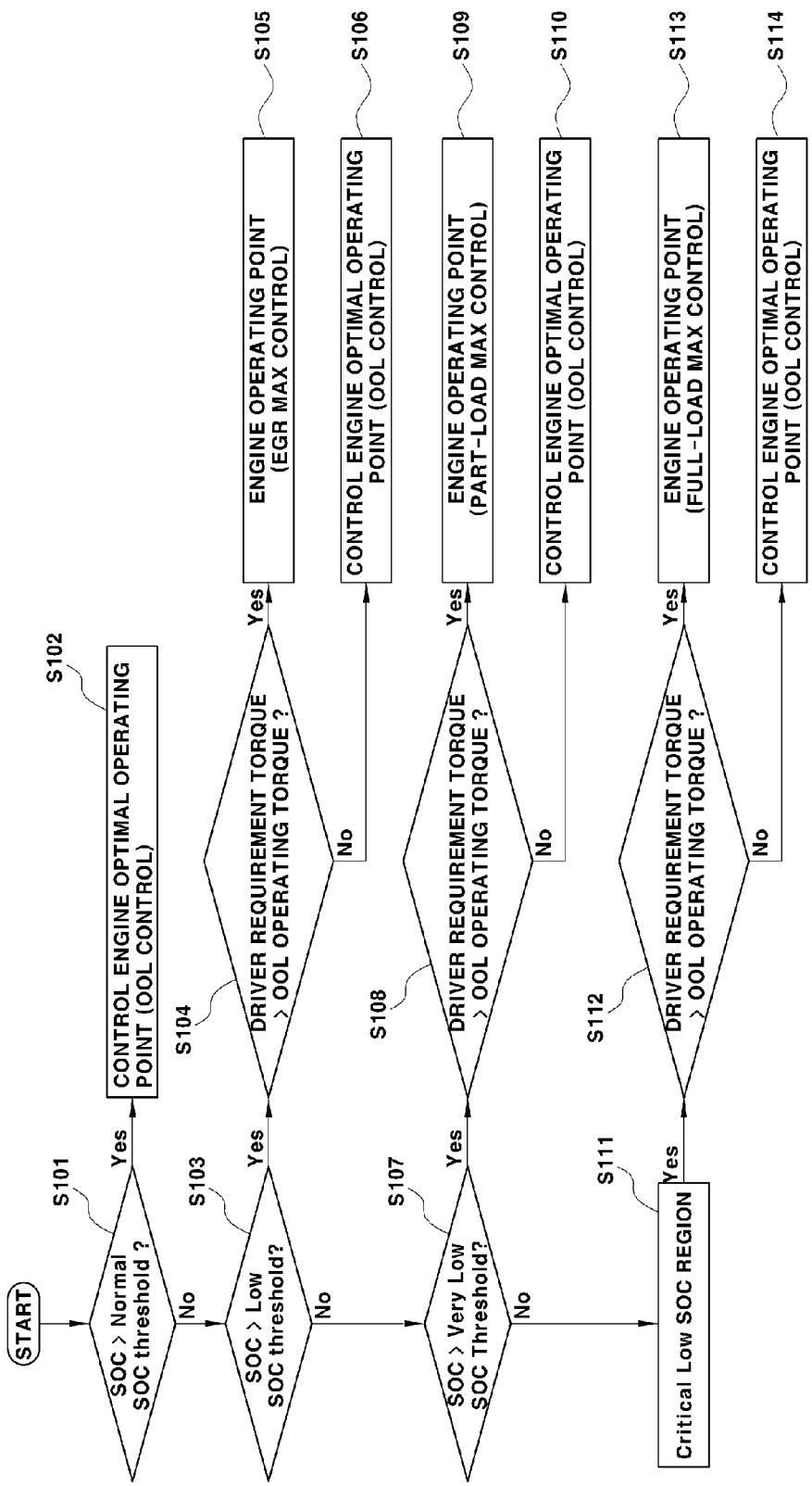
FIG. 3 is a flowchart illustrating a procedure for controlling an engine operating point of an eco-friendly vehicle according to an exemplary embodiment of the present invention.

FIG. 3 is a flowchart illustrating a procedure for controlling an engine operating point of an eco-friendly vehicle according to an exemplary embodiment of the present invention. First, a battery SOC determination unit (e.g., a battery management system (BMS)) may be configured to determine a battery SOC and transmit the determination result to a hybrid control unit (e.g., a controller). In particular, the controller may be configured to vary an engine operating point based on a battery SOC and a driver requirement torque.

In response to determining that the battery SOC is greater than a normal SOC threshold (S101), the controller may be configured to output a command for driving in an optimal operating line (OOL) in which an engine operating point constitutes an optimal operating point irrespective of a driver requirement torque to an engine electronic control unit (ECU) (S102). In response to determining that the battery SOC is in a low state (is greater than a low SOC threshold) (S103), the controller may be configured to compare a driver requirement torque determined based on an engagement degree of an acceleration pedal (e.g., the amount of pressure being exerted onto the pedal) and an engine torque in an optimal operating line (OOL) of an engine (S104).

As the comparison result of operation S104, when the driver requirement torque is greater than the engine torque in the OOL, the controller may be configured to output a command for driving a vehicle with an engine operating point in an EGR max line to the engine ECU (S105), and when the engine torque in the OOL is greater than the driver requirement torque, the controller may be configured to output a command for driving the vehicle with an engine operating point in the OOL for the optimal operating point of the engine to the engine ECU (S106).

Further, in response to determining that the battery SOC is in a very low state (e.g., is greater than a very low SOC threshold) (S107), the controller may be configured to compare a driver requirement torque determined based on the engagement degree of an acceleration pedal and an engine torque in an OOL of an engine (S108). As the comparison result of operation S108, when the driver requirement torque is greater than the engine torque in the OOL, the controller may be configured to output a command for driving a vehicle with an engine operating point in a part-load max line to the engine ECU (S109), and when the engine torque in the OOL is greater than the driver requirement torque, the controller may be configured to output a command for driving a vehicle with an engine operating point in the OOL for the optimal operating point of the engine to the engine ECU (S110).

In response to determining that the battery SOC reaches critically low (S111), the controller may be configured to compare a driver requirement torque determined based on the engagement degree of an acceleration pedal and an engine torque in an OOL of an engine (S112). As the comparison result of operation S112, when the driver requirement torque is greater than the engine torque in the OOL, the controller may be configured to output a command for driving a vehicle with an engine operating point in a full-load max line to the engine ECU (S113), and when the engine torque in the OOL is greater than the driver requirement torque, the controller may be configured to output a command for driving a vehicle with an engine operating point in an OOL for an optimal operating point to the engine ECU (S114).

The aforementioned engine operating point control procedure will be described in detail based on a battery SOC state.

Figure 4:
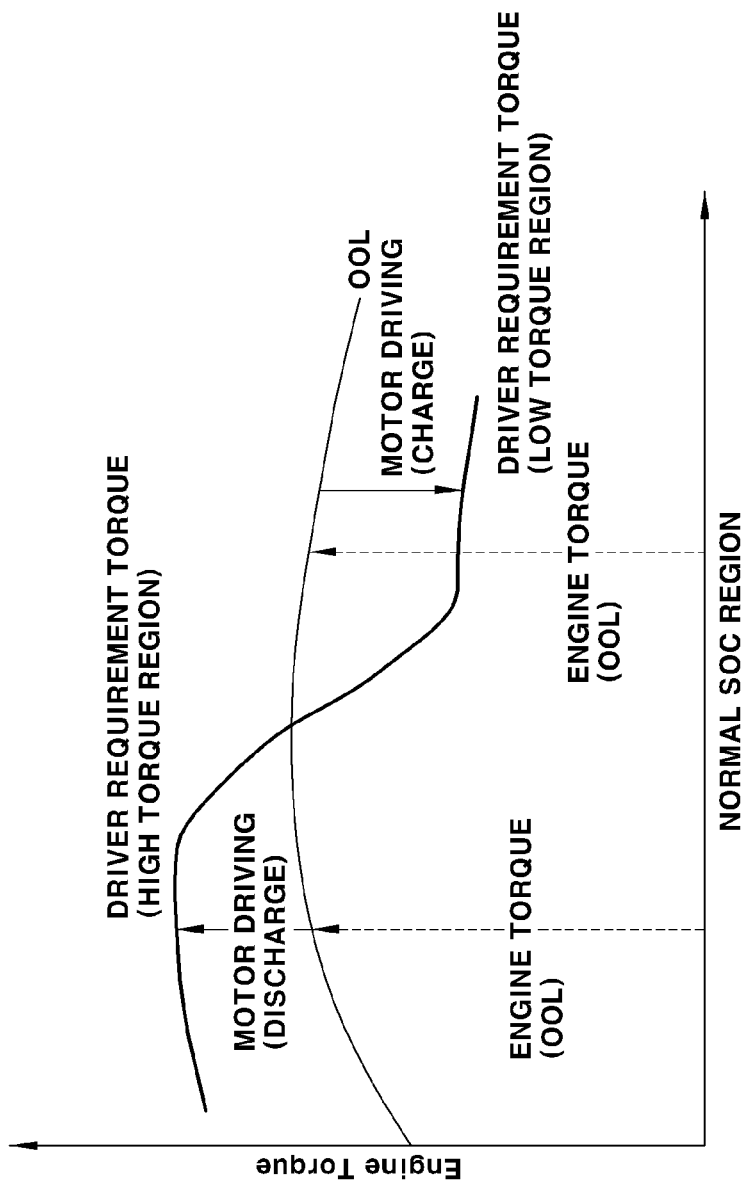
FIG. 4 is a graph illustrating an engine operating point and motor operating state control procedure in a normal battery SOC state during engine operation control of an eco-friendly vehicle according to an exemplary embodiment of the present invention.

Engine Operating Point and Motor Operating State Control in Normal Battery SOC State FIG. 4 is a graph illustrating an engine operating point and motor operating state control procedure in a normal battery SOC state during engine operation control of an eco-friendly vehicle according to an exemplary embodiment of the present invention. When the battery SOC state determined by the battery SOC determination unit is a normal state, the controller may be configured to output a command for driving a vehicle with an engine operating point in an OOL for an optimal operating point of an engine to the engine ECU. Accordingly, the engine ECU may be configured to select and adjust an engine operating point in a normal battery SOC state as an OOL, and accordingly the engine torque may be output as a torque in the OOL irrespective of a driver requirement torque.

When a torque greater than a torque in the OOL is required as the driver requirement torque, since the engine torque is output as a torque in the OOL, the driver requirement torque may not be satisfied, but when a motor operating torque is added to the engine torque, the driver requirement torque may be satisfied. In other words, the battery SOC state is in a sufficient normal state, that is, the battery SOC state is in a sufficient state for smooth discharge based on motor driving, and thus even when a torque greater than a torque in the OOL is required as the driver requirement torque, a motor driving (e.g., battery discharging state) torque may be added to the engine torque in the OOL to satisfy the driver requirement torque.

Particularly, a driving mode of a hybrid vehicle may be a hybrid electric vehicle (HEV) mode in which the vehicle is driven by both driving forces of an engine and a motor. When a torque less than a torque in the OOL is required as the driver requirement torque, since the engine torque is output as a torque in the OOL, the driver requirement torque may be sufficiently satisfied, and the motor may be driven to generate electricity for battery charging. Accordingly, an engine operating point in a normal battery SOC state may be selected and adjusted as the OOL irrespective of a driver requirement torque to achieve optimal engine operating efficiency.

When a torque greater than a torque in the OOL is required as the driver requirement torque, a motor operating torque may be added to the engine torque and the driver requirement torque may be satisfied. In addition, when a torque less than a torque in the OOL is required as the driver requirement torque, the motor may be driven to generate electricity for battery charging, and accordingly, a battery SOC may be defended.

Figure 5:
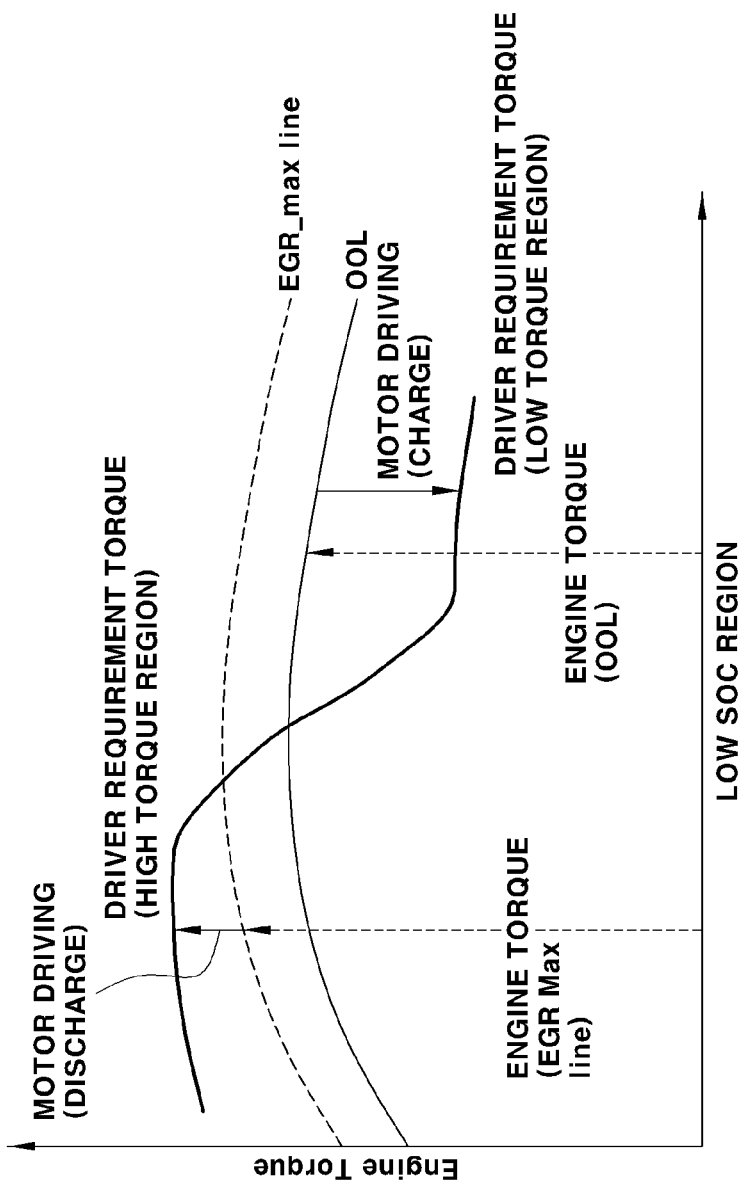
FIG. 5 is a graph illustrating an engine operating point and motor operating state control procedure in a low battery SOC state during engine operation control of an eco-friendly vehicle according to an exemplary embodiment of the present invention.

Engine Operating Point and Motor Operating State Control in Low Battery SOC State FIG. 5 is a graph illustrating an engine operating point and motor operating state control procedure in a low battery SOC state during engine operation control of an eco-friendly vehicle according to an exemplary embodiment of the present invention. When the battery SOC state determined by the battery SOC determination unit is a low state (e.g., is greater than a low SCO threshold), the controller may be configured to compare a driver requirement torque and an engine torque in an OOL of an engine.

As the comparison result, when the driver requirement torque is greater than the engine torque in the OOL, the controller may be configured to output a command for driving a vehicle with an engine operating point in an EGR max line to the engine ECU. In particular, an engine torque in the EGR max line may be greater than an engine torque in an OOL due to an increase in engine combustion efficiency according to exhaust gas recirculation. Accordingly, the engine ECU may be configured to select and adjust an engine operating point in a low battery SOC state as an EGR max line, and accordingly the engine torque may be output as a torque in the EGR max line.

When a torque greater than a torque in the EGR max line is required as the driver requirement torque, since the engine torque is output as a torque in the EGR max line, the driver requirement torque may not be satisfied, but when a motor operating torque is added to the engine torque, the driver requirement torque may be satisfied. In other words, the battery SOC state is a low state, but even when a torque greater than the torque in the EGR max line is required as the driver requirement torque, the motor driving (e.g., battery discharging state) torque may be added to the torque in the EGR max line to satisfy the driver requirement torque.

As illustrated in FIG. 5, a deviation between an engine torque in an OOL and a driver requirement torque (e.g., high torque) is substantial, but a deviation between an engine torque in an EGR max line and the driver requirement torque (e.g., high torque) may be reduced. Accordingly, a battery discharge amount during motor driving for compensating for a deviation torque between the driver requirement torque and the engine torque in the OOL in a normal battery state may be substantial, but a battery discharge amount during motor driving for compensating for a deviation torque between the driver requirement torque and the engine torque in the EGR max line in a low battery SOC state may be reduced.

Even when a battery SOC state is a low state, battery discharging based on motor driving may be performed, but the discharge amount may be reduced compared with a normal battery SOC state, and thus the battery SOC may be defended and simultaneously the driver requirement torque may be satisfied. Further, as the comparison result between an engine torque in an OOL and a driver requirement torque in a low battery SOC, when the engine torque in the OOL is greater than the driver requirement torque, a command for driving a vehicle with an engine operating point in an OOL for an optimal operating point of the engine may be output to the engine ECU.

In particular, when a torque less than a torque in the OOL is required as the driver requirement torque, the engine torque may be output as a torque in the OOL, and thus the driver requirement torque may be sufficiently satisfied, and the motor may be driven to generate electricity for battery charging. Accordingly, an engine operating point in a low battery SOC state may be selected and adjusted as the EGR max line or the OOL based on the driver requirement torque to achieve optimal engine operating efficiency.

When a torque greater than a torque in the EGR max line is required as the driver requirement torque, a motor operating torque may be added to the engine torque and the driver requirement torque may be satisfied. In addition, when a torque less than a torque in the OOL is required as the driver requirement torque, the motor may be driven to generate electricity for battery charging, and accordingly, a battery SOC may be defended.

Figure 6:
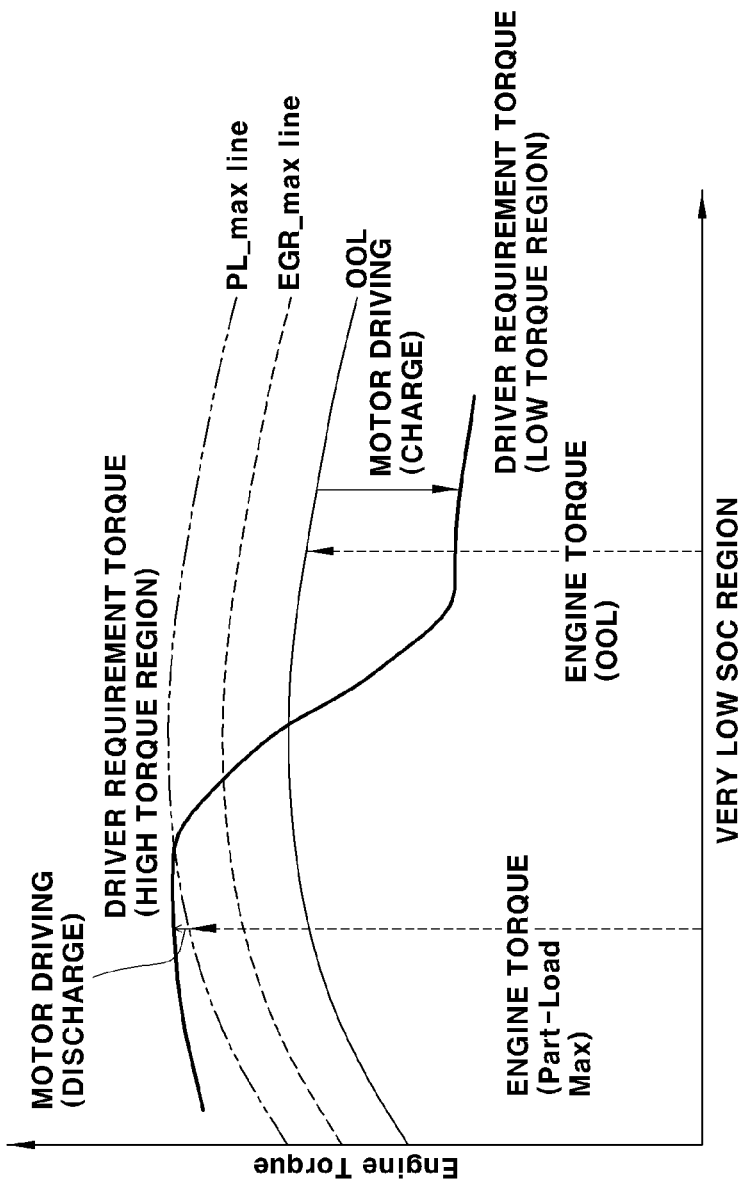
FIG. 6 is a graph illustrating an engine operating point and motor operating state control procedure in a very low battery SOC state during engine operation control of an eco-friendly vehicle according to an exemplary embodiment of the present invention.

Engine Operating Point and Motor Operating State Control in Very Low Battery SOC State FIG. 6 is a graph illustrating an engine operating point and motor operating state control procedure in a very low battery SOC state during engine operation control of an eco-friendly vehicle according to the present invention.

When the battery SOC state determined by the battery SOC determination unit is a very low state (e.g., is greater than a very low SOC threshold), the controller may be configured to compare a driver requirement torque and an engine torque in an OOL of an engine. As the comparison result, when the driver requirement torque is greater than the engine torque in the OOL, the controller may be configured to output a command for driving a vehicle with an engine operating point in a part-load max line to the engine ECU.

In particular, an engine torque in the part-load max line may be greater than an engine torque in the EGR max line. Accordingly, the engine ECU may be configured to select and adjust an engine operating point in a very low battery SOC state as a part-load max line, and accordingly the engine torque may be output as a torque in the part-load max line.

When a torque greater than a torque in the part-load max line is required as the driver requirement torque, since the engine torque is output as a torque in the part-load max line, the driver requirement torque may not be satisfied, but when a motor operating torque is added to the engine torque, the driver requirement torque may be satisfied. In other words, the battery SOC state is a very low state, but even when a torque greater than a torque in the part-load max line is required as the driver requirement torque, a motor driving (e.g., battery discharging state) torque may be added to the engine torque in the part-load max line so as to satisfy the driver requirement torque.

As illustrated in FIG. 6, a deviation between a driver requirement torque (e.g., high torque) and an engine torque in the OOL and the EGR max line is substantial, but a deviation between an engine torque in the part-load max line and the driver requirement torque may be further reduced.

Accordingly, compared with a battery discharge amount during motor driving for compensating for a deviation torque between the driver requirement torque and the engine torque in the EGR max line in a low battery SOC as well as a battery discharge amount during motor driving for compensating for a deviation torque between the driver requirement torque and the engine torque in the OOL in a normal battery state, a battery discharge amount during motor driving for compensating for a deviation torque between the driver requirement torque and the engine torque in the part-load max line may be further reduced.

Even when a battery SOC state is a very low state, battery discharging based on motor driving may be performed, but the discharge amount may be reduced compared with normal and low battery SOC states, and thus the battery SOC may be defended and simultaneously the driver requirement torque may be satisfied. As the comparison result between an engine torque in an OOL of the engine and the driver requirement torque in a very low state, when the engine torque in the OOL is greater than the driver requirement torque, a command for driving a vehicle with an engine operating point in an OOL for an optimal operating point of the engine may be output to the engine ECU.

Particularly, when a torque less than a torque in the OOL is required as the driver requirement torque, the engine torque may be output as a torque in the OOL, and thus the driver requirement torque may be sufficiently satisfied, and the motor may be driven to generate electricity for battery charging. Accordingly, an engine operating point in a very low battery SOC state may be selected and adjusted as the part-load max line or the OOL based on the driver requirement torque to achieve optimal engine operating efficiency.

When a torque greater than a torque in the part-load max line is required as the driver requirement torque, a motor operating torque may be added to the engine torque, and the driver requirement torque may be satisfied. In addition, when a torque less than a torque in the OOL is required as the driver requirement torque, the motor may be driven to generate electricity for battery charging, and accordingly, a battery SOC may be defended.

Figure 7:
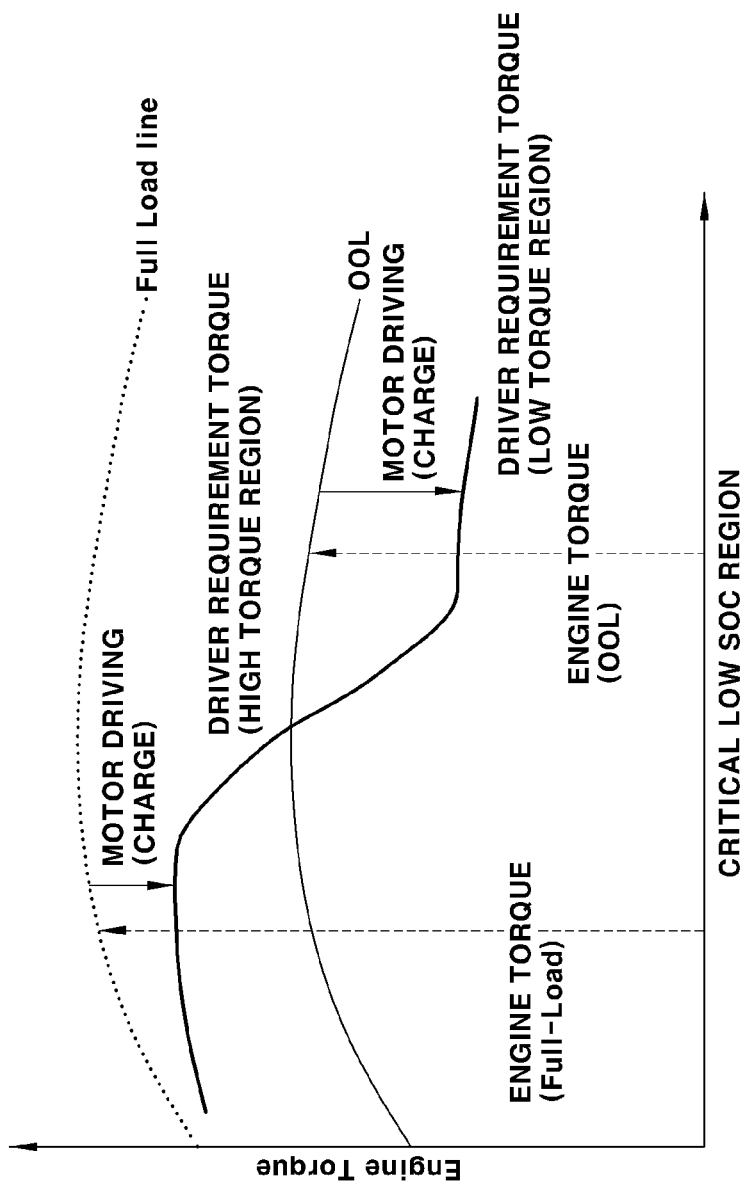
FIG. 7 is a graph illustrating an engine operating point and motor operating state control procedure in a critically low battery SOC state during engine operation control of an eco-friendly vehicle according to an exemplary embodiment of the present invention.

Engine Operating Point and Motor Operating State Control in Critically Low Battery SOC State FIG. 7 is a graph illustrating an engine operating point and motor operating state control procedure in a critically low battery SOC state during engine operation control of an eco-friendly vehicle according to an exemplary embodiment of the present invention.

When the battery SOC state determined by the battery SOC determination unit reaches a critically low level, the controller may be configured to compare the driver requirement torque determined based on the engagement degree of an acceleration pedal and an engine torque in the OOL of the engine. As the comparison result, when the driver requirement torque is greater than the engine torque in the OOL, the controller may be configured to output a command for driving a vehicle with an engine operating point in a full-load max line to the engine ECU.

In particular, an engine torque in a full-load max line may be greater than an engine torque in a part-load max line. Accordingly, the engine ECU may be configured to select and adjust an engine operating point in a critically low battery SOC as a full-load max line, and accordingly the engine torque may be output as a torque in the full-load max line, and the torque in the full-load max line may satisfy maximum requirement torque.

Accordingly, even when a torque (e.g., a maximum driver requirement torque) greater than a torque in a part-load max line as a driver requirement torque in a critically low battery SOC state, a torque in a full-load max line may be output to satisfy the maximum driver requirement torque, and thus the driver requirement torque may be satisfied more easily. When the engine torque in the full-load max line is output to satisfy the maximum driver requirement torque, a motor may be driven to generate electricity for battery charging irrespective of a driver requirement torque.

Furthermore, as the comparison result between an engine torque in an OOL of the engine and a driver requirement torque in a critically low battery SOC, when the engine torque in the OOL is greater than the driver requirement torque in the critically low battery SOC, a command for driving a vehicle with an engine operating point in an OOL for an optimal operating point of the engine may be output to the engine ECU. In particular, when a torque less than a torque in the OOL is required as the driver requirement torque, the engine torque may be output as a torque in the OOL, and thus the driver requirement torque may be sufficiently satisfied, and the motor may be driven to generate electricity for battery charging.

Accordingly, an engine operating point in a critically low battery SOC state may be selected and adjusted as the full-load max line or the OOL based on the driver requirement torque to achieve optimal engine operating efficiency. An engine torque in the full-load max line may be output to satisfy the maximum driver requirement torque to satisfy the driver requirement torque. In addition, the motor may be driven to generate electricity for battery charging irrespective of the driver requirement torque, and accordingly, a battery SOC may be defended.

Through the aforementioned features of the present invention, the present invention may provide the following advantages.

First, an engine operating point may be varied and adjusted based on a battery SOC and a driver requirement torque to achieve optimal engine operating efficiency.

Second, when a high torque is required as a driver requirement torque when a battery SOC is low or very low, a motor operating torque may be added to an engine torque to satisfy the driver requirement torque.

Third, when a high torque is required as a driver requirement torque when a battery SOC is low or very low, a battery discharge amount based on motor discharging may be minimized and a motor charging operation may also be guided to cause battery charging, and accordingly, a battery SOC may be appropriately handled.

Fourth, even when a battery SOC is in a critically low state, a motor may be driven to generate electricity for battery charging irrespective of a driver requirement torque, and accordingly, a battery SOC may be defended.

What is claimed is:

1. An engine operation control system of an eco-friendly vehicle, comprising:
   a controller comprising a battery state of charge (SOC) determination unit connected to a battery and configured to:
   determine a battery SOC state; and
   change and adjust an engine operating point based on the determined battery SOC state and a driver requirement torque,
   wherein when the battery SOC state is in a normal state that is greater than a normal SOC threshold, the controller is configured to drive the vehicle with an engine operating point in an optimal operating line (OOL) of an engine, and when the battery SOC state is equal to or less than the normal SOC threshold, the controller is configured to change and adjust the engine operating point based on a comparison result between the driver requirement torque and an engine torque in an OOL of the engine, and
   wherein the controller is configured to drive the vehicle with an engine operating point in an exhaust gas recirculation (EGR) max line when the battery SOC state is in a low state that is less than the normal SOC threshold and the driver requirement torque is greater than the engine torque in the OOL.

2. The engine operation control system of claim 1, wherein the controller is configured to add a motor operating torque to an engine torque in an OOL when the battery SOC state is in the normal state that is greater than the normal SOC threshold and a torque greater than the engine torque in the OOL is required as the driver requirement torque.

3. The engine operation control system of claim 1, wherein the controller is configured to maintain an engine operating point as an OOL and simultaneously drive a motor to generate electricity for battery charging when the battery SOC state is in the normal state that is greater than the normal SOC threshold and a torque less than the engine torque in the OOL is required as the driver requirement torque.

4. The engine operation control system of claim 1, wherein the controller is configured to add a motor operating torque to the engine torque in the EGR max line when the battery SOC state is in the low state that is greater than a low SOC threshold and a torque greater than the engine torque in the EGR max line is required as the driver requirement torque.

5. The engine operation control system of claim 1, wherein the controller is configured to maintain an engine operating point as an OOL and simultaneously drive a motor to generate electricity for battery charging when the battery SOC state is in the low state that is greater than a low SOC threshold and a torque less than the engine torque in the OOL is required as the driver requirement torque.

6. The engine operation control system of claim 1, wherein the controller is configured to drive the vehicle with an engine operating point in a part-load max line when the battery SOC state is in a very low state, that is less than the normal SOC threshold, that is greater than a very low SOC threshold and the driver requirement torque is greater than the engine torque in the OOL.

7. The engine operation control system of claim 6, wherein the controller is configured to add a motor operating torque to an engine torque in a part-load max line when the battery SOC state is in the very low state that is greater than the very low SOC threshold and a torque greater than the engine torque in the part-load max line is required as the driver requirement torque.

8. The engine operation control system of claim 6, wherein the controller is configured to maintain an engine operating point as an OOL and simultaneously drive a motor to generate electricity for battery charging when the battery SOC state is in the very low state that is greater than the very low SOC threshold and a torque less than the engine torque in the OOL is required as the driver requirement torque.

9. The engine operation control system of claim 1, wherein the controller is configured to drive the vehicle with an engine operating point in a full-load max line satisfying a maximum driver requirement torque when the battery SOC state is in a battery SOC state that reaches a critically low level that is less than the normal SOC threshold and the driver requirement torque is higher than the engine torque in the OOL.

10. The engine operation control system of claim 9, wherein the controller is configured to drive a motor to generate electricity for battery charging irrespective of a driver requirement torque when the battery SOC state is in a battery SOC state that reaches the critically low level and the vehicle is driven with an engine operating point in a full-load max line.

11. The engine operation control system of claim 9, wherein the controller is configured to maintain an engine operating point as an OOL and simultaneously drive the motor to generate electricity for battery charging when the battery SOC state is in a battery SOC state that reaches the critically low level and a torque less than the engine torque in the OOL is required as the driver requirement torque.

12. An engine operation control method of an eco-friendly vehicle, comprising:
    determining, by a controller, a battery state of charge (SOC) state;
    determining, by the controller, a driver requirement torque; and
    changing and adjusting, by the controller, an engine operating point based on the determined battery SOC state and driver requirement torque,
    wherein, when the battery SOC state is in a normal state that is greater than a normal SOC threshold, the vehicle is driven with an engine operating point in an optimal operating line (OOL) of an engine, and when the battery SOC state is in equal to or less than the normal SOC threshold, the engine operating point is changed and adjusted based a comparison result between the driver requirement torque and an engine torque in an OOL of the engine, and
    wherein the changing and adjusting includes driving, by the controller, the vehicle with an engine operating point in an exhaust gas recirculation (EGR) max line when the battery SOC state is in a low state that is less than the normal SOC threshold and the driver requirement torque is greater than the engine torque in the OOL.

13. The method according to claim 12, wherein the changing and adjusting includes adding, by the controller, a motor operating torque to an engine torque in an OOL when the battery SOC state is in the normal state that is greater than the normal SOC threshold and a torque greater than the engine torque in the OOL is required as the driver requirement torque.

14. The method according to claim 12, wherein the changing and adjusting includes maintaining, by the controller, an engine operating point as an OOL and simultaneously driving a motor to generate electricity for battery charging when the battery SOC state is in the normal state that is greater than the normal SOC threshold and a torque less than the engine torque in the OOL is required as the driver requirement torque.

15. The method according to claim 12, wherein the changing and adjusting includes adding, by the controller, a motor operating torque to the engine torque in the EGR max line when the battery SOC state is in the low state that is greater than a low SOC threshold and a torque greater than the engine torque in the EGR max line is required as the driver requirement torque.

16. The method according to claim 12, wherein the changing and adjusting includes maintaining, by the controller, an engine operating point as an OOL and simultaneously driving a motor to generate electricity for battery charging when the battery SOC state is in the low state that is greater than a low SOC threshold and a torque less than the engine torque in the OOL is required as the driver requirement torque.

17. The method according to claim 12, wherein the changing and adjusting includes driving, by the controller, the vehicle with an engine operating point in a part-load max line when the battery SOC state is in a very low state, that is less than the normal SOC threshold, that is greater than a very low SOC threshold and the driver requirement torque is greater than the engine torque in the OOL.

18. The method according to claim 17, wherein the changing and adjusting includes adding, by the controller, a motor operating torque to an engine torque in a part-load max line when the battery SOC state is in the very low state that is greater than the very low SOC threshold and a torque greater than the engine torque in the part-load max line is required as the driver requirement torque.

19. The method according to claim 17, wherein the changing and adjusting includes maintaining, by the controller, an engine operating point as an OOL and simultaneously driving the motor to generate electricity for battery charging when the battery SOC state is in the very low state that is greater than the very low SOC threshold and a torque less than the engine torque in the OOL is required as the driver requirement torque.

20. The method according to claim 12, wherein the changing and adjusting includes driving, by the controller, the vehicle with an engine operating point in a full-load max line satisfying a maximum driver requirement torque when the battery SOC state is in a battery SOC state that reaches a critically low level that is less than the normal SOC threshold and the driver requirement torque is greater than the engine torque in the OOL.

21. The method according to claim 20, wherein the changing and adjusting includes driving, by the controller, a motor to generate electricity for battery charging irrespective of a driver requirement torque when the battery SOC state is a battery SOC state that reaches the critically low level and the vehicle is driven with an engine operating point in a full-load max line.

22. The method according to claim 20, wherein the changing and adjusting includes maintaining, by the controller, an engine operating point as an OOL and driving a motor to generate electricity for battery charging when the battery SOC state is in a battery SOC state that reaches the critically low level and a torque less than the engine torque in the OOL is required as the driver requirement torque.

* * * * *